United States Patent
Song (10) Patent No.: US 12,147,067 B2
(45) Date of Patent: Nov. 19, 2024

(54) OPTICAL SYSTEM WITH OPTICAL FIBER AND CONTROL METHOD THEREOF

(71) Applicant: HYUNDAI MOBIS CO., LTD., Seoul (KR)

(72) Inventor: Kiryong Song, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/475,381

(22) Filed: Sep. 27, 2023

(65) Prior Publication Data

US 2024/0125997 A1   Apr. 18, 2024

(30) Foreign Application Priority Data

Oct. 13, 2022   (KR) ........................ 10-2022-0131458

(51) Int. Cl.
*F21V 8/00*   (2006.01)
*F21V 23/00*   (2015.01)

(52) U.S. Cl.
CPC .......... *G02B 6/0006* (2013.01); *F21V 23/003* (2013.01); *G02B 6/001* (2013.01)

(58) Field of Classification Search
CPC ..... G02B 6/0006; G02B 6/001; F21V 23/003; F21W 2103/35; F21W 2103/20; F21S 43/235; F21S 43/237; F21S 43/247; F21S 43/249

See application file for complete search history.

(56) References Cited

U.S. PATENT DOCUMENTS

| 10,222,022 B2 * | 3/2019 | Potter | F21S 43/243 |
| 2016/0103261 A1 * | 4/2016 | Bauco | G02B 6/0288 |
| | | | 362/552 |

FOREIGN PATENT DOCUMENTS

| JP | 2017-027662 | * | 2/2017 | ............ F21S 43/237 |
| JP | 2022512097 A | | 2/2022 | |

OTHER PUBLICATIONS

JP 2017-027662, Feb. 2, 2017, Koizumi et al., English Translation (Year: 2017).*

* cited by examiner

*Primary Examiner* — Peggy A Neils
(74) *Attorney, Agent, or Firm* — Novo TechIP International PLLC (57) ABSTRACT

The present invention relates to an optical system, and more particularly, to an optical system with optical fiber. According to an optical system with optical fiber and a method of controlling an optical system with optical fiber of the present invention, it is possible to implement two different light radiating functions by applying a side light emitting optical system to a vehicle lamp and applying light sources of different wavelengths to both sides.

18 Claims, 10 Drawing Sheets

OPTICAL SYSTEM WITH OPTICAL FIBER AND CONTROL METHOD THEREOF

CROSS-REFERENCE TO RELATED APPLICATIONS

This application claims priority under 35 U.S.C. § 119 to Korean Patent Application No. 10-2022-0131458, filed on Oct. 13, 2022, in the Korean Intellectual Property Office, the disclosure of which is incorporated herein by reference in its entirety.

TECHNICAL FIELD

The following disclosure relates to an optical system, and more particularly, to an optical system with optical fiber.

BACKGROUND

The related art has mainly used a light guide in which a light source is positioned at one end to guide light of the light source in order to implement a linear-uniform image through side emission. In the case of the existing light guides, a light source is applied only to one side of both end portions, and has been applied in a form in which it is positioned along a line to radiate light in order to utilize side light of the applied light source.

In addition, the existing light guides were made of static plastic materials and were limited in disposition, and it was difficult to apply an additional optical system such as an inner lens to the side to which the light source was not applied. Accordingly, there was a problem in utilizing light radiated to a side to which the light source was not applied after the side emission.

In addition, even when the light source was applied to both sides of the existing light guides, since there was an optical system serving to control an optical path on the rear, it was difficult to independently perform two different functions of each light source. More specifically, when both light sources were turned on and off, it was difficult to perform precise control such as alternately blinking both light sources.

Related Art Document: Japanese Patent Laid-Open No. 2022-512097 "Illumination light source and vehicle light" incorporated herein by reference it its entirety.

SUMMARY

An embodiment of the present invention is directed to providing an optical system with optical fiber and a method of controlling the optical system with optical fiber capable of implementing two different light radiating functions by applying a side emitting optical system to a vehicle lamp and applying light sources of different wavelengths to both sides.

In addition, an embodiment of the present invention is directed to providing an optical system with optical fiber and a method of controlling an optical system with optical fiber capable of additionally using light radiated backward after side emission by installing an additional optical system at an end portion of the optical fiber where a light source is not installed.

In one general aspect, an optical system with optical fiber includes a light source unit that includes at least one light source incorporated into a bezel of a lamp and positioned outside a light radiating area of the lamp, a light emitting unit that receives and radiates light from the light source unit, and a control unit that controls the light source unit, in which the light emitting unit includes at least one optical fiber including a core part at a center thereof and a cladding part at an edge thereof.

The light source unit may include a first light source disposed at one end of the optical fiber.

The light emitting unit may include two or more optical fibers having a first light source disposed at one end thereof.

The optical fiber may be disposed across the light radiating area of the lamp, and the light source unit may further include a second light source that is disposed at the other end of the optical fiber and generates light having a different wavelength from that of the first light source.

The optical fiber may include a lighting area in which transparency of the cladding part is equal to or less than a predetermined value, and a non-lighting area in which the transparency of the cladding part exceeds the predetermined value.

The non-lighting area may be positioned at both ends of the optical fiber and may be positioned in an area incorporated into the bezel.

The control unit may generate a control signal, the control signal may include a first light emitting signal for applying a voltage to the first light source so that the light emitting unit radiates light of the first light source and a second light emitting signal for applying a voltage to the second light source so that the light emitting unit radiates light of the second light source.

The control unit may generate a control signal, the control signal may include a third light emitting signal for causing the light emitting unit to radiate light having an intermediate wavelength of the first light source and the second light source, and in the third light emitting signal, the control unit may determine a mixing ratio of the first light source and the second light source, alternately blink the first light source and the second light source, and adjust a light generating time of the first light source and the second light source in proportion to the determined mixing ratio.

The optical fiber may further include a light exit unit through which light is radiated at the other end thereof, and the light exit unit may be positioned outside the bezel.

The optical fiber may further include a light exit unit through which light is radiated at the other end thereof, and in the light emitting unit, the optical fiber may be disposed across the light radiating area of the lamp, and may further include an additional optical system that is disposed at the other end of the optical fiber to radiate light radiated from the other end of the optical fiber to the outside of the bezel.

The additional optical system may include a reflective surface that is disposed at the other end of the optical fiber but disposed so that a focal position coincides with the position of the light exit unit, and a first inner lens that is interlocked to the reflective surface and a position fixed to the bezel.

The additional optical system may include a second inner lens that is disposed so that a focal position coincides with a position of the light exit unit and have a position fixed to the bezel.

In another general aspect, a method of controlling an optical system with optical fiber performed by a control unit includes: (a) collecting information; (b) generating a control signal based on the information collected in step (a); and (c) controlling a light source unit according to the control signal generated in step (b).

The step (b) may include (b1) generating, by the control unit, a first light emitting signal by controlling the light source unit so that a light emitting unit radiates light of a first light source, and the step (c) may include (c1) applying, by the control unit, a voltage to the first light source.

The step (b) may include (b2) generating, by the control unit, a second light emitting signal by controlling the light source unit so that a light emitting unit radiates light of a second light source, and the step (c) may include (c2) applying, by the control unit, a voltage to the second light source.

The step (b) may include (b3) generating, by the control unit, a third light emitting signal by controlling the light source unit so that a light emitting unit radiates light having an intermediate wavelength of a first light source and a second light source, and The step (c) may include (c3) determining, by the control unit, a mixing ratio of the first light source and the second light source and (c4) alternately applying, by the control unit, a voltage to the first light source and the second light source so that each of the first light source and the second light source has a light generation time proportional to the mixing ratio.

DETAILED DESCRIPTION

Hereinafter, the technical spirit of the present invention will be described in more detail with reference to the accompanying drawings. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best mode.

Hereinafter, a configuration of an optical system 1000 with optical fiber of the present invention will be described with reference to FIGS. 1 and 2.

Figure 1:
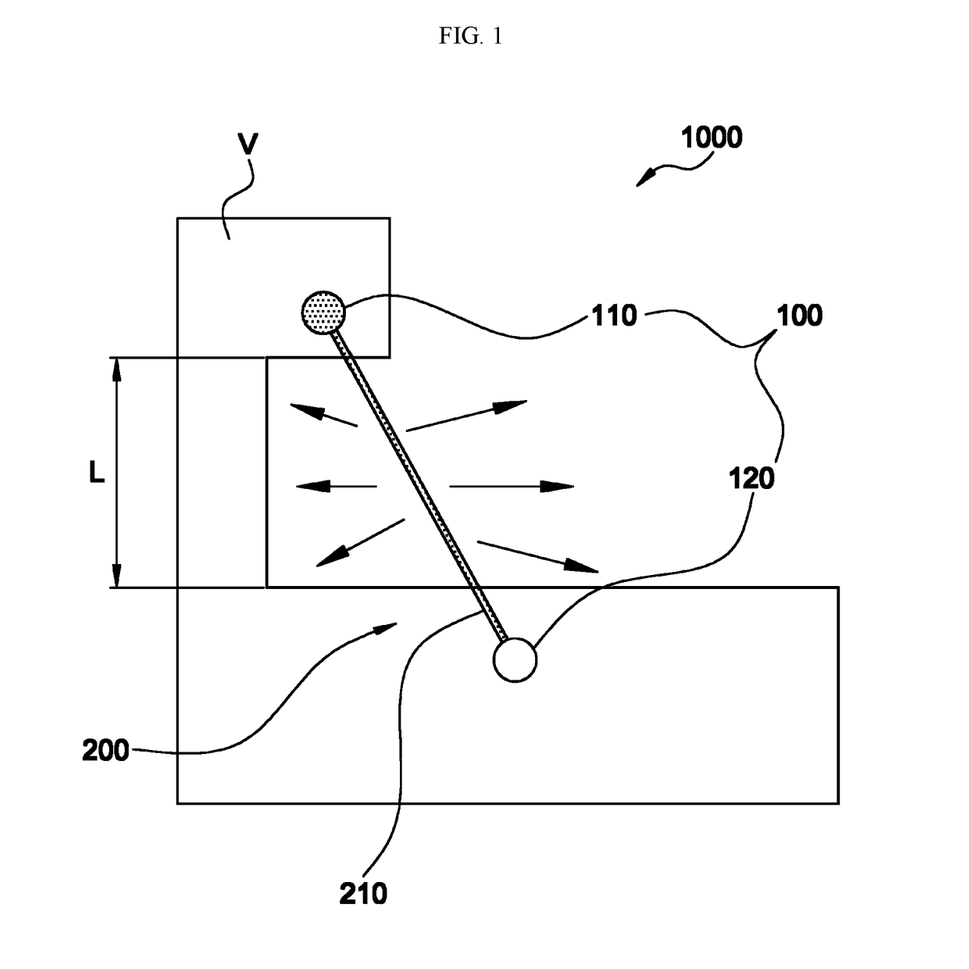
FIG. 1 is a schematic diagram illustrating an optical system with optical fiber of the present invention.
Figure 2:
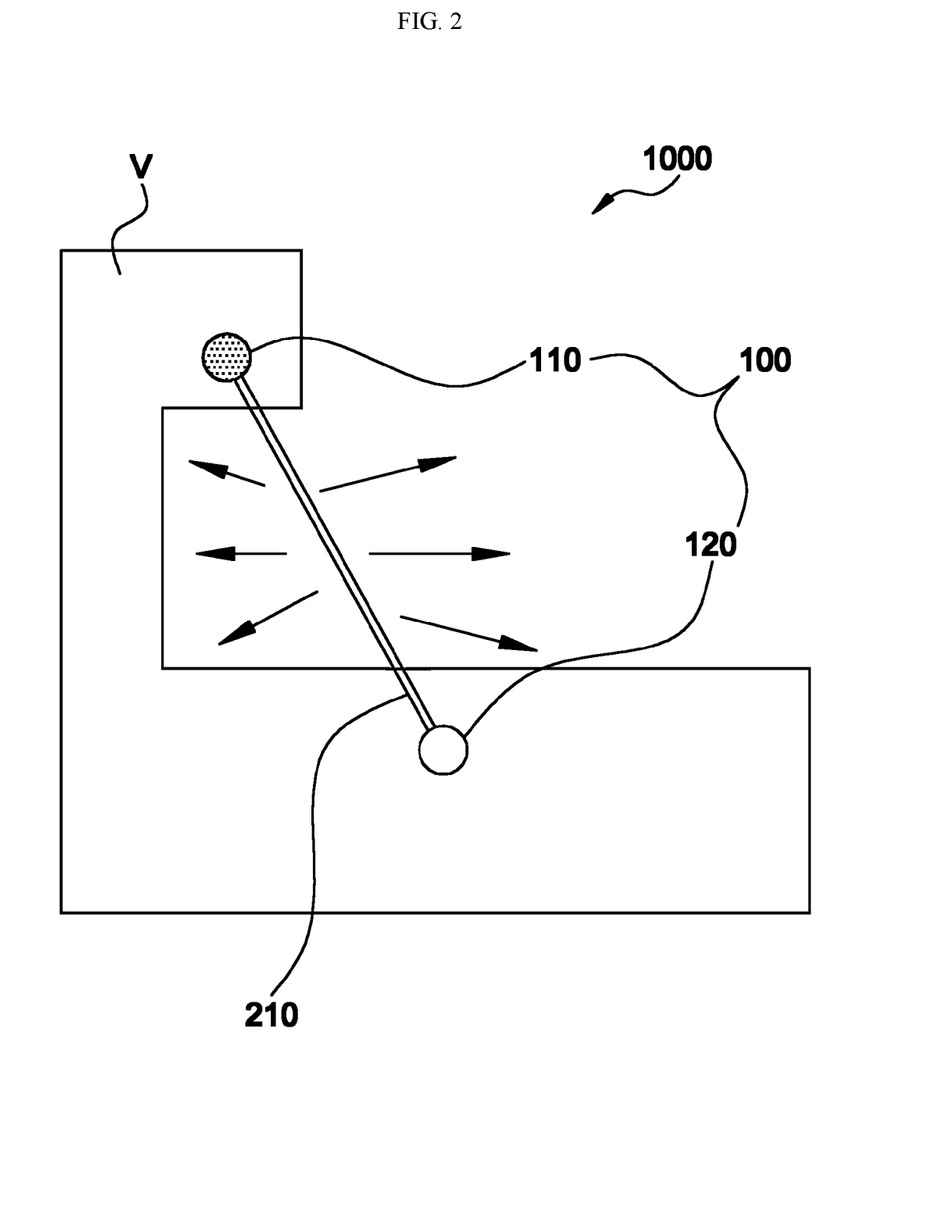
FIG. 2 is a schematic diagram illustrating additional functions of the optical system with optical fiber of the present invention.

As illustrated in FIG. 1, an optical system 1000 with optical fiber according to the present invention may include a light source unit 100 and a light emitting unit 200. In more detail, the light source unit 100 may be incorporated into the bezel V of the lamp, and may be incorporated into a bezel V positioned outside a light radiating area L of a lamp. That is, it is preferable that the light source unit 100 is incorporated into an area covered by the bezel V, which is not visible to the outside.

In this case, the light emitting unit 200 may receive light of the light source unit 100 and radiate the light to the outside of the lamp. The light emitting unit 200 may have a shape elongated to cross the light radiating area L of the lamp, the light source unit 100 may be applied to at least one of both ends of the extension, and the light emitting unit 200 receive light of the light source unit 100 to radiate the light of the light source unit 100 in a direction perpendicular to an extension direction, that is, in a lateral direction. The light emitting unit 200 may include an optical fiber 210. The optical fiber 210 may include a core part 211 at a center thereof and a cladding part 212 surrounding the core part 211 at an edge thereof. The optical fiber 210 may be made of a flexible material. For example, two or more optical fibers 210 extending in the same direction and each having a separate core part 211 may be included. Accordingly, a better effect in terms of light transmission efficiency may be implemented than when a single core part 211 is present.

The optical system 1000 with optical fiber of the present invention adopts the optical fiber 210 in the light emitting unit 200, so the light of the light source unit 100 may be radiated in all directions on the side. Accordingly, the emitted light may be deposited on an exposed surface of the bezel V, and more diverse and three-dimensional lighting images may be implemented.

In addition, the light source unit 100 preferably includes the first light source 110 disposed at one end of the optical fiber 210. The first light source 110 may radiate light to the core part 211 of the optical fiber 210. Thereafter, the light of the first light source 110 may be transmitted to the other side through internal total reflection within the core part 211, and some of the light may pass through the cladding part 212 and be radiated to the outside of the optical fiber 210, so the entire side of the optical fiber 210 may emit light. The light radiated through the side of the optical fiber 210 may be displayed outside the lamp.

In addition, the light source unit 100 may further include a second light source 120 disposed at the other end of the optical fiber 210 and generating light of a different wavelength from the first light source 110, and the second light source 120 may radiate light to the core part 211 of the optical fiber 210. Then, as illustrated in FIG. 2, the light of the second light source 120 may be radiated to the outside of the optical fiber 210 through the cladding part 212 so that the entire side of the optical fiber 210 may emit light, and may be displayed outside the lamp. In this way, by disposing light sources of different wavelengths at both ends of the optical fiber 210, two different light radiating functions may be implemented.

In more detail, when the optical system 1000 with optical fiber of the present invention is applied to a vehicle lamp, the first light source 110 may be a red light serving as a brake light, and the second light source 120 may be a yellow light serving as left and right blinkers. Accordingly, by applying the optical system 1000 with optical fiber of the present invention, only controlling a voltage applied to the first light source 110 and the second light source 120 without division of space or operation of additional hardware may cause two different light irradiating functions to be performed.

In addition, the optical system 1000 with optical fiber of the present invention may include a control unit 300 that controls the light source unit 100. The control unit 300 may receive or generate predetermined information, determine a light emission mode based on the information, and control the light source unit 100 in the determined light emission mode. Details will be described later.

Hereinafter, an embodiment of the optical fiber 210 of the present invention will be described with reference to FIGS. 3 and 4.

Figure 3:
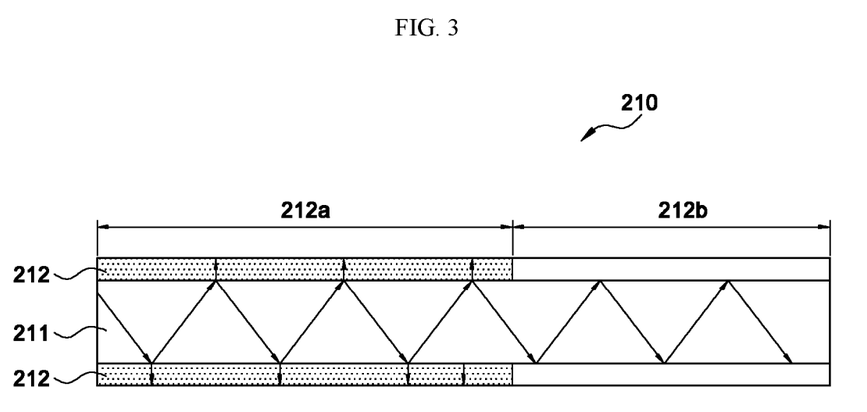
FIG. 3 is a cross-sectional view illustrating an embodiment of an optical fiber of the present invention.

As illustrated in FIG. 3, the optical fiber 210 may include a lighting area 212a in which transparency of the cladding part 212 is less than or equal to a predetermined value, and a non-lighting area 212b in which the transparency of the cladding part 212 exceeds a predetermined value. That is, in the lighting area 212a, light is diffusely reflected by the cladding part 212 so that the side of the optical fiber 210 may emit light, and in the non-lighting area 212b, the light passes through the cladding part 212 so that the side of the optical fiber 210 may not emit light.

Figure 4:
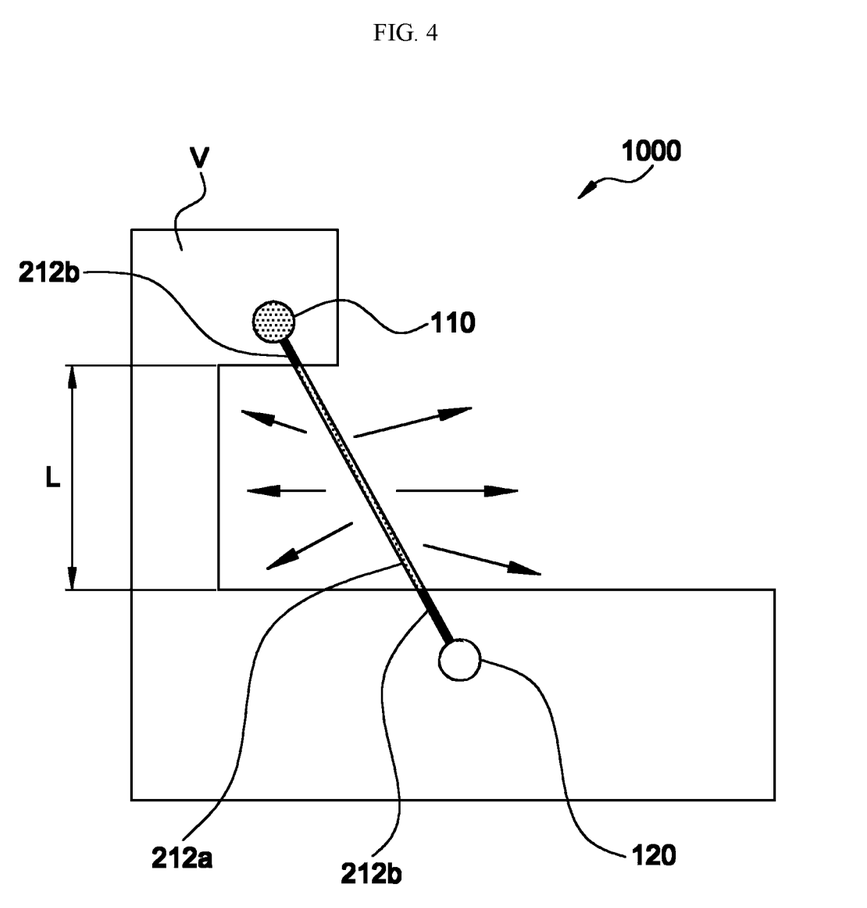
FIG. 4 is a schematic diagram illustrating a coupling relationship between an embodiment of an optical fiber of the present invention and a bezel.

In more detail, as illustrated in FIG. 4, the non-lighting area 212b is positioned at both ends of the optical fiber 210 and is preferably positioned in an area that is incorporated into the bezel V, that is, positioned outside the abovementioned light radiating area L or in an area that is covered by the bezel V that is not visible to the outside. Accordingly, in the case of a part where the side emission is not required, the light of the core part 211 is not radiated to the outside, but may move to the end of the optical fiber 210 through the total internal reflection, and the light moving to the end may be recycled. That is, unnecessary light loss may be minimized.

Figure 5:
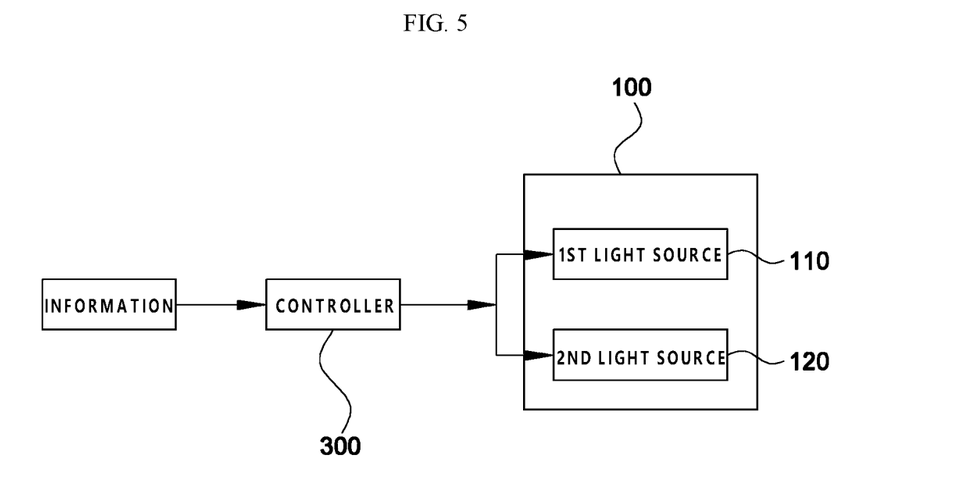
FIG. 5 is a block diagram illustrating a function of a control unit of the present invention.

Hereinafter, the control unit 300 of the present invention will be described with reference to FIG. 5.

As described above, the control unit 300 may generate a control signal for controlling the light source unit 100. The control signal may include a first light emitting signal and a second light emitting signal. In more detail, the control unit 300 may transmit a first light reflection signal to the light source unit 100 to apply a voltage to the first light source 110 but block a voltage to the second light source 120. Accordingly, the light emitting unit 200 may radiate light of the first light source 110. In addition, the control unit 300 may transmit a second light reflection signal to the light source unit 100 to block a voltage to the first light source 110 but apply a voltage to the second light source 120. Accordingly, the light emitting unit 200 may radiate light of the second light source 120.

For example, the first light source 110 may be a red light serving as a brake light, and the second light source 120 may be a yellow light serving as left and right blinkers. Accordingly, by applying the optical system 1000 with optical fiber of the present invention, only controlling a voltage applied to the first light source 110 and the second light source 120 without division of space or operation of additional hardware may cause two different light irradiating functions to be performed. In this case, the first light emitting signal and the second light emitting signal may be generated based on user information input to the control unit 300 in real time.

In addition, the control signal may further include a third light emitting signal that causes the light emitting unit 200 to radiate light having an intermediate wavelength of the first light source 110 and the second light source 120. In the third light emitting signal, the control unit 300 may determine a mixing ratio of the first light source 110 and the second light source 120. It is preferable to alternately blink the first light source 110 and the second light source 120, and adjust a light generation time of the first light source 110 and the second light source 120 in proportion to the determined mixing ratio.

For example, the first light source 110 may be a red light of about 610 nm, the second light source 120 may be a red light of about 630 nm. The control unit 300 may alternately blink the first light source 110 and the second light source 120 through a third light emitting signal to express light in the range of 610 nm to 630 nm as a gradation. This may be applied to enhance aesthetics of the existing light expression, or can be used when transmitting a special signal to the outside. In this case, a third emitting signal may be generated based on user information or navigation information, external illuminance, and the like input to the control unit 300 in real time.

Figure 6:
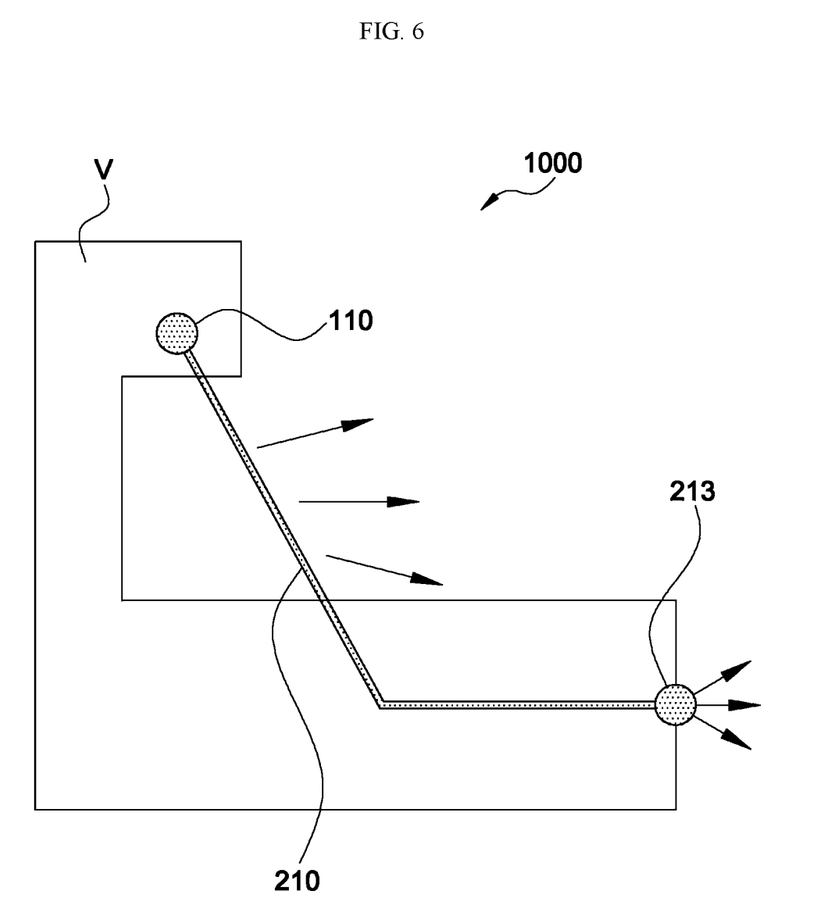
FIG. 6 is a schematic diagram showing an embodiment of a light exit unit of the present invention.

Hereinafter, the additional optical system 220 and the light exit unit 213 of the present invention will be described in more detail with reference to FIGS. 6 to 8.

The optical fiber 210 may further include a light exit unit 213 from which light is emitted at the other end. In this case, it is preferable that the first light source 110 may be disposed at one end of the optical fiber 210, and the light source is not disposed at the other end of the optical fiber 210. Accordingly, the light of the first light source 110 may be radiated to the outside of the optical fiber 210 through the light exit unit 213. In an embodiment of the light exit unit 213 of the present invention, as illustrated in FIG. 6, the light exit unit 213 may be positioned outside the bezel V and directly radiate the light of the first light source 110 moving to the other end of the optical fiber 210 to the outside of the bezel V.

In addition, in the light emitting unit 200, it is preferable that the optical fiber 210 is disposed across the light radiating area L of the lamp, and further includes an additional optical system 220 that is disposed at the other end of the optical fiber 210 to radiate light radiated from the other end of the optical fiber 210 to the outside of the bezel V. In this way, since the optical fiber 210 includes the light exit unit 213 and the additional optical system 220, the light radiated to an end portion where the light source unit 100 is not disposed may be utilized and efficiency compared to power consumption may increase.

Figure 7:
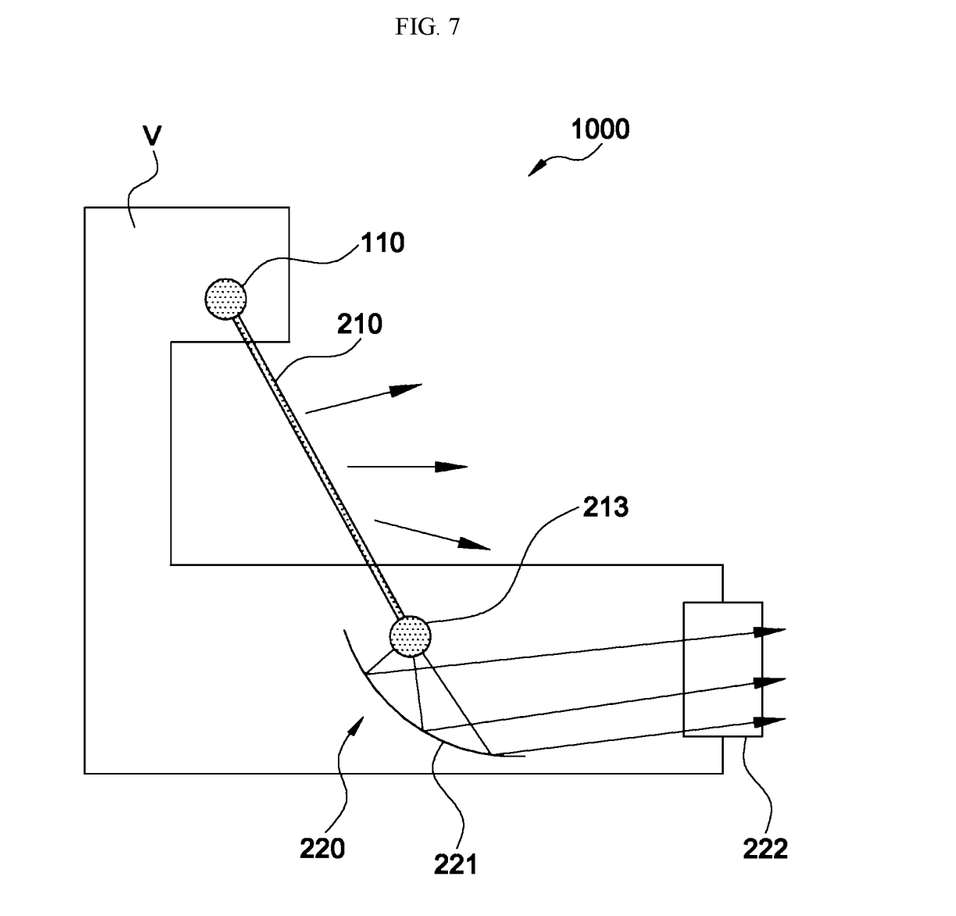
FIG. 7 is a schematic diagram illustrating a first embodiment of an additional optical system of the present invention.

In more detail, as illustrated in FIG. 7, in the first embodiment of the additional optical system 220 of the present invention, the additional optical system 220 may include a reflective surface 221 and a first inner lens 222. In more detail, the reflective surface 221 may be disposed at the other end of the optical fiber 210 so that a focal position coincides with the position of the light exit unit 213. The reflective surface 221 is preferably incorporated inside the bezel V. In addition, the first inner lens 222 may be interlocked with the reflective surface 221, one surface may be in contact with the outside of the bezel V, and the position of the first inner lens 222 may be fixed to the bezel V. Accordingly, the light of the first light source 110 radiated from the light exit unit 213 is reflected by the reflective surface 221 and then processed and irradiated to the outside of the bezel V through the first inner lens 222.

Figure 8:
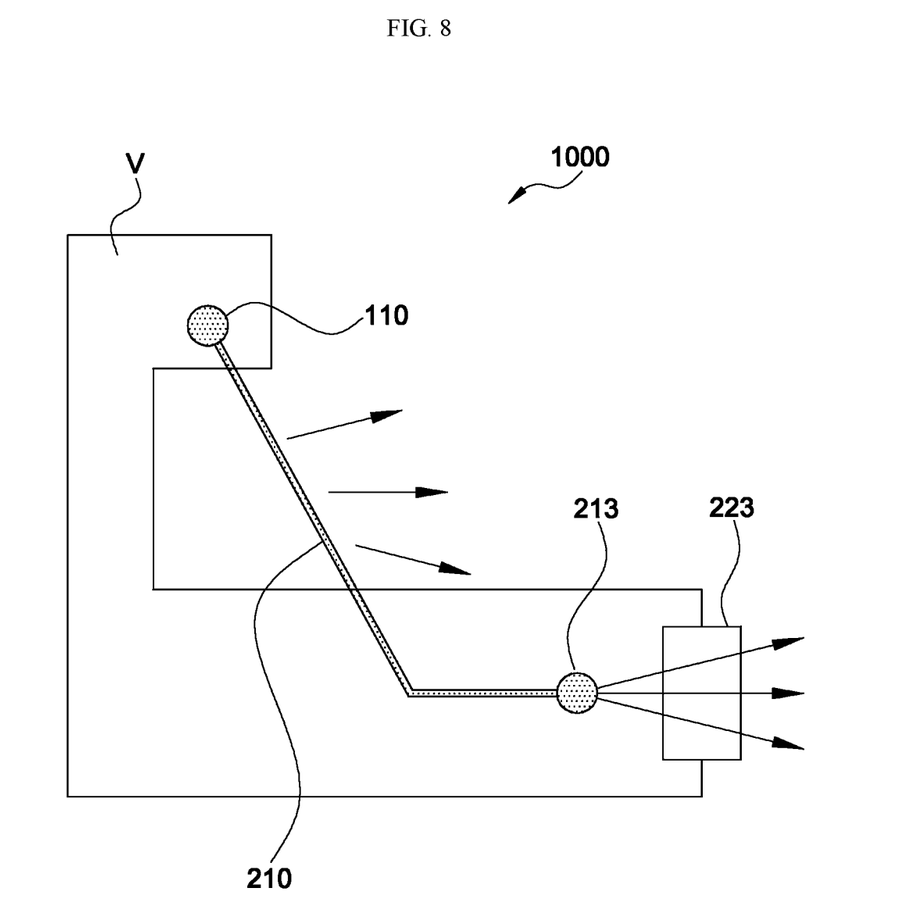
FIG. 8 is a schematic diagram illustrating a second embodiment of an additional optical system of the present invention.

In addition, in the second embodiment of the additional optical system 220 of the present invention, as illustrated in FIG. 8, the additional optical system 220 is disposed so that the focal position coincides with the position of the light exit unit 213, but preferably includes the second inner lens 223 whose position is fixed to the bezel V. The second inner lens 223 may be interlocked with the light exit unit 213, one surface may be in contact with the outside of the bezel V, and the position of the second inner lens 223 may be fixed to the bezel V. Accordingly, the light of the first light source 110 radiated from the light exit unit 213 is reflected by the reflective surface 221 and then processed and irradiated to the outside of the bezel V through the first inner lens 222.

Hereinafter, a method of controlling an optical system 1000 with optical fiber of the present invention will be described with reference to FIGS. 9 and 10.

Figure 9:
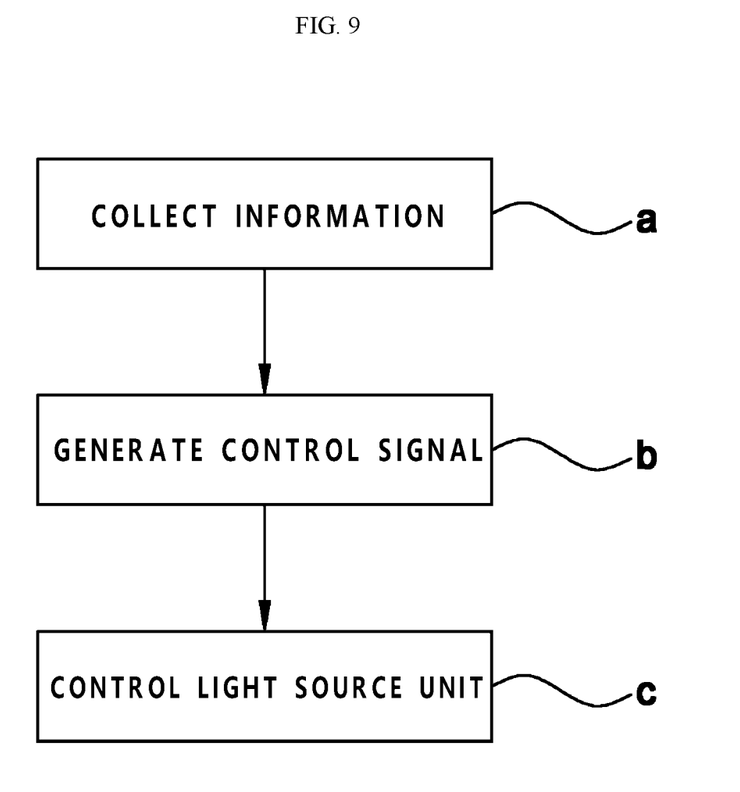
FIG. 9 is a flowchart illustrating a method of controlling an optical system with optical fiber according to the present invention.

As illustrated in FIG. 9, in the method of controlling an optical system 1000 with optical fiber of the present invention, it is preferable that the control unit 300 includes (a) collecting information; (b) generating a control signal based on the information collected in step (a); and (c) controlling a light source unit 100 according to the control signal generated in step (b). In this case, the information collected by the control unit 300 in step (a) may be information directly input by a user, or at least one of navigation information, external illumination, and weather information of a vehicle to which the optical system 1000 with optical fiber is applied.

Figure 10:
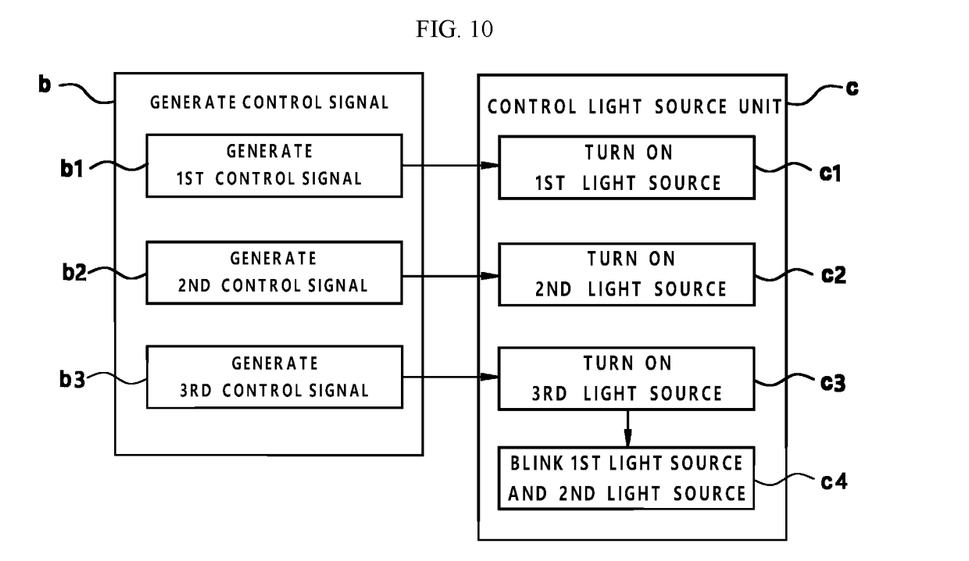
FIG. 10 is a flowchart illustrating detailed steps of a control signal generation step and a light source unit control step of the present invention.

In more detail, as illustrated in FIG. 10, it is preferable that the step (b) includes (b1) generating, by the control unit 300, a first light emitting signal by controlling a light source unit 100 so that a light emitting unit 200 radiates light of a first light source 110, (b2) generating, by the control unit, a second light emitting signal by controlling the light source unit 100 so that the light emitting unit 200 radiates light of a second light source 120, and (b3) generating, by the control unit, a third light emitting signal by controlling the light source unit 100 so that the light emitting unit 200 radiates light having an intermediate wavelength of the first light source 110 and the second light source 120.

Steps (b1), (b2), and (b3) are not sequentially performed, but are preferably performed alternatively according to the information collected in step (a). In more detail, any one of steps (b1) and (b2) may be performed so that when user input information (left and right blinkers, emergency lights, and brakes) is input, light corresponding thereto is radiated. In addition, step (b3) may be performed when the control unit 300 receives at least one of navigation information, external illumination, and weather information of a vehicle to which the optical system 1000 with optical fiber is applied and a predetermined specific condition is satisfied.

After step (b), step (c) may be performed accordingly. More specifically, it is preferable that, after step (b1) is performed, step (c1) of applying, by the control unit 300, a voltage to the first light source 110 may be performed, and after step (b2) is performed, step (c2) of applying, by the control unit 300, a voltage to the second light source 120 may be performed, and after step (b3) is performed, step (c3) of determining, by the control unit 300, a mixing ratio of the first light source 110 and the second light source 120, and step (c4) of alternately applying, by the control unit 300, a voltage to the first light source 110 and the second light source 120 so that each of the first light source 110 and the second light source 120 has a light generation time proportional to the mixing ratio are performed.

For example, the first light source 110 in step (c1) may be a red light serving as a brake light, and the second light source 120 in step (c2) may be a yellow light serving as left and right blinkers. Accordingly, only controlling a voltage applied to the first light source 110 and the second light source 120 without division of space or operation of additional hardware may cause two different light irradiating functions to be performed.

In addition, in step (c3), the first light source 110 may be a red light of about 610 nm, and the second light source 120 may be a red light of about 630 nm. The control unit 300 may express the light in the range of 610 nm to 630 nm in a gradation by alternately blinking the first light source 110 and the second light source 120 through the third light emitting signal, so it may be applied to enhance the aesthetics of the existing light expression or used when transmitting a special signal to the outside.

According to the optical system with optical fiber and the method of controlling the optical system with optical fiber of the present invention according to the above configuration, it is possible to implement two different light radiating functions by applying a side emitting optical system to a vehicle lamp and applying light sources of different wavelengths to both sides.

In addition, by installing an additional optical system at the end portion of the optical fiber where the light source is not installed, it is possible to additionally use light radiated backward after side emission.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. An optical system with optical fiber, comprising:
  a light source unit that includes at least one light source incorporated into a bezel of a lamp and positioned outside a light radiating area of the lamp;
  a light emitting unit that receives and radiates light from the light source unit; and
  a control unit that controls the light source unit,
  wherein the light emitting unit includes at least one optical fiber including a core part at a center thereof and a cladding part at an edge thereof, and
  the at least one light source includes a first light source disposed at one end of the optical fiber;
  wherein the optical fiber includes a lighting area in which transparency of the cladding part is equal to or less than a predetermined value, and
  a non-lighting area in which the transparency of the cladding part exceeds the predetermined value; and
  wherein the non-lighting area is positioned at both ends of the optical fiber and in an area incorporated into the bezel.

2. The optical system with optical fiber of claim 1, wherein the light emitting unit includes two or more optical fibers having the first light source disposed at one end thereof.

3. The optical system with optical fiber of claim 1, wherein the optical fiber is disposed across the light radiating area of the lamp, and
  the light source unit further includes a second light source that is disposed at an opposite end of the optical fiber and that generates light having a different wavelength from that of the first light source.

4. The optical system with optical fiber of claim 3, wherein the control unit generates a control signal,
  the control signal includes a first light emitting signal for applying a voltage to the first light source so that the light emitting unit radiates light of the first light source, and
  a second light emitting signal for applying a voltage to the second light source so that the light emitting unit radiates light of the second light source.

5. The optical system with optical fiber of claim 3, wherein the control unit generates a control signal,
the control signal includes a light emitting signal for causing the light emitting unit to radiate light having an intermediate wavelength of the first light source and the second light source, and
in the light emitting signal, the control unit determines a mixing ratio of the first light source and the second light source,
alternately blinks the first light source and the second light source, and
adjusts a light generating time of the first light source and the second light source in proportion to the determined mixing ratio.

6. The optical system with optical fiber of claim 1, wherein:
the optical fiber further includes a light exit unit through which light is radiated, and the light exit unit is positioned outside the bezel.

7. The optical system with optical fiber claim 1, wherein:
the optical fiber further includes a light exit unit through which light is radiated, and
in the light emitting unit, the optical fiber is disposed across the light radiating area of the lamp, and
the light emitting unit further includes an additional optical system that is disposed at a second opposite end of the optical fiber to radiate light of the optical fiber to the outside of the bezel.

8. An optical system with optical fiber, comprising:
a light source unit that includes at least one light source incorporated into a bezel of a lamp and positioned outside a light radiating area of the lamp;
a light emitting unit that receives and radiates light from the light source unit; and
a control unit that controls the light source unit,
wherein the light emitting unit includes at least one optical fiber including a core part at a center thereof and a cladding part at an edge thereof, and
the at least one light source includes a first light source disposed at one end of the optical fiber;
wherein:
the optical fiber further includes a light exit unit through which light is radiated, and
in the light emitting unit, the optical fiber is disposed across the light radiating area of the lamp, and
the light emitting unit further includes an additional optical system that is disposed at a second opposite end of the optical fiber to radiate light of the optical fiber to the outside of the bezel; and
wherein the additional optical system includes:
a reflective surface disposed at the other end of the optical fiber and comprising a curved surface that forms a focus at a predetermined position upon light incidence, the focus position being arranged to coincide with a position of the light exit unit; and
a first inner lens that is interlocked to the reflective surface and has a position fixed to the bezel.

9. The optical system with optical fiber of claim 7, wherein the additional optical system includes a second inner lens that is disposed so that a focal position of the second inner lens coincides with the position of the light exit unit and has a position fixed to the bezel.

10. A method of controlling an optical system with optical fiber performed by a control unit, the method comprising:
(a) collecting information;
(b) generating a control signal based on the information collected in (a); and
(c) controlling a light source unit according to the control signal generated in (b);
wherein the light source unit includes a first light source incorporated into a bezel of a lamp and positioned outside a light radiating area of the lamp, the first light source being disposed at a first end of the optical fiber, the optical fiber extending through the light radiating area of the lamp;
wherein generating the control signal further includes generating, by the control unit, a first light emitting signal so that the light radiating area radiates light of the first light source, and the method further comprises applying, by the control unit, a voltage to the first light source;
wherein generating the control signal further includes generating, by the control unit, a second light emitting signal so that the light radiating area radiates light of a second light source disposed at a second end of the optical fiber, and the method further comprises applying, by the control unit, a voltage to the second light source; and
wherein generating the control signal includes generating, by the control unit, a third light emitting signal so that the light radiating area radiates light having an intermediate wavelength of the first light source and the second light source, and
controlling the light source unit includes
determining, by the control unit, a mixing ratio of the first light source and the second light source, and
alternately applying, by the control unit, a voltage to the first light source and the second light source so that each of the first light source and the second light source has a light generation time proportional to the mixing ratio.

11. The optical system with optical fiber of claim 1, wherein the control unit is configured to operate the first light source at a first wavelength to utilize the lamp as a brake light and to operate the second light source at a second wavelength to utilize the lamp as a turn signal.

12. The optical system with optical fiber of claim 1, wherein the control unit is configured to (a) collect information comprising one of information directly input by a user, navigation information, external illumination information, and weather information; and (b) generate a control signal for the light source unit based on the information collected.

13. The optical system with optical fiber of claim 3, wherein the control unit is configured to (a) collect information comprising one of information directly input by a user, navigation information, external illumination information, and weather information; and (b) generate a control signal for the light source unit based on the information collected.

14. The optical system with optical fiber of claim 8, wherein the control unit is configured to operate the first light source at a first wavelength to utilize the lamp as a brake light and to operate the second light source at a second wavelength to utilize the lamp as a turn signal.

15. The optical system with optical fiber of claim 8, wherein the control unit is configured to (a) collect information comprising one of information directly input by a user, navigation information, external illumination information, and weather information; and (b) generate a control signal for the light source unit based on the information collected.

16. The optical system with optical fiber of claim 8, wherein the light emitting unit includes two or more optical fibers having the first light source disposed at one end thereof.

17. The optical system with optical fiber of claim 8, wherein the optical fiber includes a lighting area in which transparency of the cladding part is equal to or less than a predetermined value, and
    a non-lighting area in which the transparency of the cladding part exceeds the predetermined value.

18. The optical system with optical fiber of claim 17, wherein the non-lighting area is positioned at both ends of the optical fiber and in an area incorporated into the bezel.

* * * * *